United States Patent [19]

Varela

[11] Patent Number: 4,483,630

[45] Date of Patent: Nov. 20, 1984

[54] ULTRASONIC THERMOMETER

[75] Inventor: David W. Varela, Tucson, Ariz.

[73] Assignee: Thomas M. Kerley, Albuquerque, N. Mex. ; a part interest

[21] Appl. No.: 385,294

[22] Filed: Jun. 4, 1982

[51] Int. Cl.³ ............................................. G01K 11/22
[52] U.S. Cl. .................................... 374/119; 374/117
[58] Field of Search ....................... 374/119, 117, 118

[56] References Cited

U.S. PATENT DOCUMENTS

| | | |
|---|---|---|
| 3,216,970 | 11/1965 | Miller . |
| 3,514,747 | 5/1970 | Lynnworth et al. . |
| 3,540,265 | 11/1970 | Lynnworth . |
| 3,580,076 | 5/1971 | Mobsby .............................. 374/119 |
| 3,633,423 | 1/1972 | Bell . |
| 3,717,033 | 2/1973 | Gordon et al. ..................... 374/119 |
| 4,020,692 | 5/1977 | Arave . |
| 4,195,523 | 4/1980 | Tasman et al. ..................... 374/119 |

OTHER PUBLICATIONS

New Sensors for Ultrasound: Measuring Temp. Profiles, Lynnworth and Patch Materials Research and Standards, Aug. 1970, vol. 10, No. 8.

Primary Examiner—Charles Frankfort
Assistant Examiner—David R. Schuster
Attorney, Agent, or Firm—J. Michael McClanahan

[57] ABSTRACT

An improved ultrasonic thermometer of the acoustic pulse-echo type for measuring high temperatures and temperature profiles having a magnetostrictive head surrounded by an acoustic pulse generating and pulse sensing apparatus having a positioned electromagnetic coil, the magnetostrictive head joined to an elongated heat sensing wire having a plurality of discontinuities at the distal end thereof to reflect a portion of the propagated acoustic pulse, the improvement comprising a lock fixedly holding the acoustic pulse generating and pulse sensing electromagnetic coil in alignment after initial adjustment in order to achieve long term stability. More specifically, the improvements comprise placement of a circumferential groove in the elongated wire sensor proximate its joinder to the magnetostrictive head, the securing of the pulse generating and pulse sensing apparatus by an acoustic mismatched material lock at the circumferential groove, and a threaded screw for positioning the electromagnetic coil surrounding the magnetostrictive head to compensate for spurious reflection and to maintain long term stability.

9 Claims, 3 Drawing Figures

ULTRASONIC THERMOMETER

BACKGROUND OF THE INVENTION

Ultrasonic thermometers for measuring high temperatures and temperature profiles are known in the art and have become more important with increased research at high temperatures. These ultrasonic thermometers operate by sensing changes in the velocity of reflected sound waves propagated through a sensor in contact with the object for which the temperature is desired to be known.

Generally, ultrasonic thermometers consist of an electromagnetic coil surrounded magnetostrictive iron-cobalt head welded to a thoriated tungsten wire which comprises the means by which the heat is sensed. At the tip of the thoriated tungsten wire heat sensor are small notches or discontinuities formed at regular intervals. The portion of the thoriated tungsten wire sensor in contact with the matter which temperature is to be measured is usually contained in a protective tungsten sheath.

The electromagnetic coil surrounding a portion of the magnetostrictive iron-cobalt head is pulsed with an electrical pulse generating a pulsed magnetic field which produces acoustic or sound pulses in the magnetostrictive head. These sound pulses are propagated through the magnetostrictive head to the thoriated tungsten wire sensor which continues the acoustic pulse along the wire sensor to the area of the notches. Each time it passes a pair of formed notches or discontinuities in the wire sensor, a reflection of part of that acoustic pulse is sent back to the magnetostrictive head. Such procedures continue with each notch until the sound pulse reaches the end or tip of the sensor at which time it is returned back to the magnetostrictive iron-cobalt head.

As the pulses from each pair of notches return to the magnetostrictive head, it is sensed by the electromagnetic coil, such signals then amplified and sent on to a signal-processing console for conversion to temperature data. Since the velocity of the reflected pulses between adjacent notches is dependent upon the temperature of the thoriated tungsten wire sensor between the notches, the time between reflected pulses can be translated into an average temperature between adjacent notches.

Problems however have existed in these ultrasonic thermometers due to factors such as maintaining accuracy of the temperature measurements over extended periods of time between different tests and where the equipment may be subject to handling by technicians. It is usual that long and involved calibrating procedures are necessary between tests because of the dependence of the readings upon mechanical factors in the construction and maintenance of the thermometer leading to errors induced by repeated handling by technicians.

Misalignment of the elements of the ultrasonic thermometers in small amounts can easily result in sensed temperature variation errors of $\pm 50°$ C. Similarily, errors in observed temperatures can occur when the fixture itself holding the elongated wire sensor relative to the pulsing element interferes with the propagation of the ultrasonic signals.

In addition, it has been observed that improper coupling of the elements of prior art ultrasonic thermometers make vast changes in the sensed temperatures for repeated tests leading to inaccuracies in test results.

Another problem area the solution of which has eluded investigators in the past is how to deal with tip reflection, i.e., signal reflection at the end of the elongated wire sensor, since the variation of magnitude of the tip reflection due to coupling and other factors is relatively large in comparison with the other reflected signals. In fact, the general conclusion is that information from end reflection is useless because of the difficulties encountered in trying to reproduce coupling conditions from test to test.

It is to the solution of these problems which the improved invention is directed in order to facilitate accurate and repeatable results not affected by technicians handling or variances in element fabrication and coupling.

SUMMARY OF THE INVENTION

The present invention provides an improved ultrasonic thermometer of the pulse-echo type in which high frequency sound waves propagate through a thin wire sensor to be reflected in part from notches or discontinuities in the sensor. By this technique, the differences in arrival time of the reflected sound waves from two adjacent discontinuities is monitored. Knowing the distance between the discontinuities and monitoring the different arrival times is indicative of the average temperature in the section of the sensor between the discontinuities, and temperature profiles along the sensor can be measured with a single wire sensor by placing multiple notches or discontinuities at measured distances along the wire sensor.

The accuracy, reliability, versatility, and repeatability of sensed temperatures in the wire sensor is obtained through the Applicant's improvements in such areas of construction including rigid constraint and alignment of the magnetostrictive head and sensor wire to the pulsing and receiving elements so that the pulsed and reflected acoustic signals are minimally distorted to reduce possible errors in the sensed temperatures.

More particularily, an annular or circumferential groove is cut into the wire sensor proximate its attachment to the magnetostrictive head. A break apart graphite sheath type lock with an annular inward protruding holding ring grips the annular groove of the sensor wire in a securing configuration. The graphite sheath lock is then held in a sensor line holder by graphite set screws engaging the halves of the graphite sheath lock.

Other improvements to Applicant's device are the means by which Applicant couples the electromagnetic pulsing and receiving coil to the magnetostrictive rod or head attached to the sensor line. In this respect, Applicant fabricates a bobbin for containing the coil turns of the electromagnetic coil, which bobbin is held in a bobbin holder. The bobbin holder in turn is connected to the sensor line holder by means of adjustable rod lengths.

Additional improvements by the Applicant to prior art ultrasonic thermometers include placing the annular groove by which the wire sensor is held by the graphite sheath proximate the attachment of the wire sensor to the magnetostrictive iron-cobalt head. In this manner the reflected sound wave of the discontinuity formed by the welded connection of the iron-cobalt magnetostrictive head to the thoriated tungsten wire sensor is swamped by the annular groove formed proximately thereto and does not allow creation of spurious signals which heretofore would cause unreliable readings.

In addition, Applicant's device, by the adjustment of the electromagnetic coil on the magnetostrictive iron-cobalt head provides opportunity for constructive addition of the large reflected wave returning from the end of the head not connected to the thoriated wire sensor to the acoustic pulse transmitted.

Through the accomplishment of precisely aligned pulsating components, i.e., the electromagnetic coil, and the fixed relationship of the elements in the device give repeatable accurate measurements made by the subject ultrasonic thermometer.

Accordingly, it is therefore an object of the subject invention to provide an ultrasonic thermometer which maintains its accuracy over periods of time.

Another object of the subject invention is to provide an ultrasonic thermometer which obviates inaccuracies due to discontinuities presented by connections between the elements of the device.

A still further objective of the subject invention is to provide an ultrasonic thermometer which constructively adds the heretofore undesirable reflection from the magnetostrictive head.

Other objects of the invention will in part be obvious and will in part appear hereinafter. The invention accordingly comprises the apparatus possessing the construction, combination of elements, and arrangement of parts which are exemplied in the following detailed disclosure, and the scope of the application of which will be indicated in the claims.

BRIEF DESCRIPTION OF THE DRAWINGS

For further understanding of the nature and objects of the present invention, reference should be made to the following detailed description taken in connection with accompanying drawings wherein.

In the various views, like index numbers refer to like elements.

DETAILED DESCRIPTION OF THE PREFERRED EMBODIMENT

Figure 1:
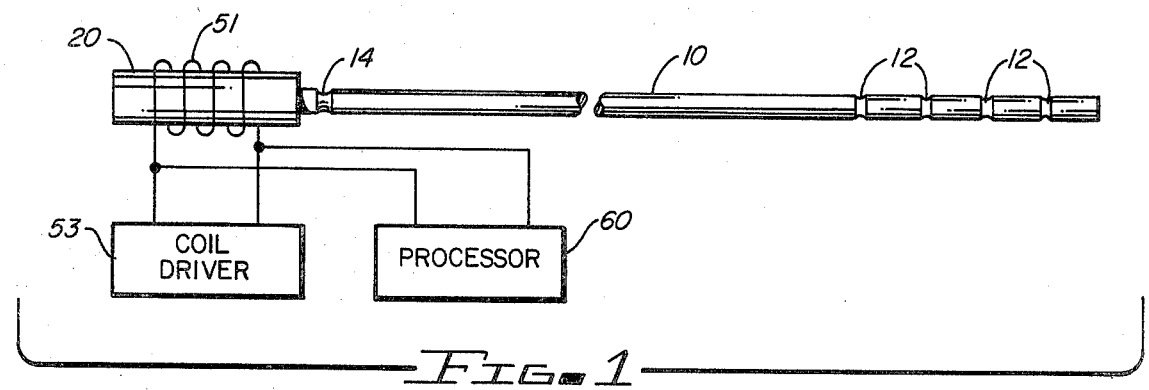
FIG. 1 is a schematic block diagram of an ultrasonic thermometer system.

Referring now to FIG. 1, a schematic block diagram of Applicant's ultrasonic thermometer system is detailed. In the lower left hand portion of FIG. 1 is the electromagnetic pulse coil driver 53 which originates the electrical pulse at a selected magnitude, width, and rate, which in turn is applied to the electromagnetic coil 51 surrounding the magnetostrictive head 20, commonly an alloy of 48% cobalt, 47.6% iron, 4% vanadium, and 0.4 manganese. Connected at one end of the rod-like magnetostrictive head 20 is elongated wire sensor 10 having at selected places thereon, a plurality of discontinuities or notches 12 which have been formed or cut into the wire sensor. In many applications, wire sensor 10 is a thoriated tungsten alloy material. Connection of the elongated wire sensor 10 to the magnetostrictive head 20 is accomplished in most cases by welding. Noted proximate to the wire sensor 10 and magnetostrictive head 20 joinder is an additional notch 14 which characterizes one of the features of Applicant's invention. Attached to the electrical wires connecting coil driver 53 to electromagnetic coil 51 is signal processor 60.

Operation of the ultrasonic thermometer is as follows. Coil driver 53 generates the electric pulse which is electrically conducted to electromagnetic coil 51 producing in electromagnetic coil 51 a pulsed electromagnetic field surrounding magnetostrictive coil 20. This pulsed electromagnetic field produces in magnetostrictive head 20 a change of lengthing which in turn produces an acoustic pulse in head 20, which acoustic pulse travels away from the location of electromagnetic coil 51 in both directions along the magnetostrictive head 20. At the free end of magnetostrictive head 20, the acoustic wave is reflected which must be accounted for as later discussed. At the opposite end of magnetostrictive head 20 the acoustic pulse is transferred to the elongated wire sensor 10, traveling to its end thereof where it too is reflected. In both cases, it is realized that the acoustic wave is attenuated as it travels throughout both the magnetostrictive head 20 and elongated wire sensor 10 so that the reflected waves are of lesser magnitude than the original produced waves. In addition, at each discontinuity in the elongated wire sensor 10, a portion of the acoustic wave transmitted along the elements is reflected in the direction opposite. In the drawing shown in FIG. 1, in addition to the acoustic wave being reflected from the free end of megnetostrictive head 20, a reflection will occur at the place of joinder of elongated wire sensor 10 to magnetostrictive head 20, as well as at each discontinuity or notch 12 formed in elongated wire sensor 10.

The function of processor/computer 60 is to sense when the electromagnetic pulse has formed the acoustic pulse, and to sense each reflective acoustic pulse returned by each of the discontinuities in both elements, i.e., magnetostrictive head 20 and elongated sensor 10.

The reflected acoustic pulses travel from each of the discontinuities back to the magnetostrictive head 20 where they induce in electromagnetic coil 51 an electrical pulse which is sensed by the processor 60.

Since it is known that sound or acoustic waves travel at velocities directly dependent upon temperature in the wire sensor 10, it is obvious that knowing the distance between discontinuities in wire sensor 10, and measuring the difference in time of reflected acoustic pulses from adjacent discontinuities, the average temperature of the elongated wire sensor 10 between the discontinuities can be directly determined, and thus a temperature profile of the elongated wire sensor 10 may be determined. If the elongated wire sensor 10 is in contact with materials or objects whose temperature is to be obtained, the output of the processor then will indicate the time between adjacent pulses which is indicative of the average temperatures between adjacent discontinuities.

Processors/computers which include timers/counters measure and display the elapsed time between reflected acoustic pulses, and convert each time to temperature, are commonly known in the field and readily available. It is noted that if desired, an oscilloscope input may be placed across electromagnetic coil 51, and in which case by appropriate horizontal time scale, each of the reflected acoustic pulses may be observed and the time interval therebetween measured.

Figure 2:
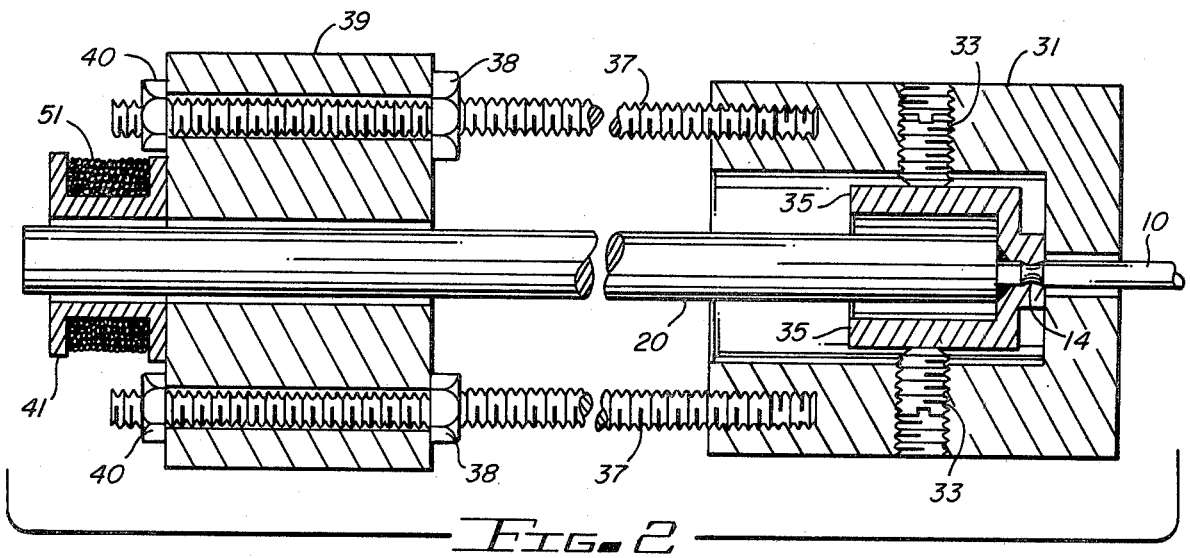
FIG. 2 is an enlarged cross-sectional view of the fixture for rigidly holding, aligning, and adjusting the sensor line and pulsing components.

Referring now to FIG. 2, an enlarged cross-sectional view of the acoustic pulse generating and pulse sensing means fixture for rigidly holding, aligning, and precisely adjusting the electromagnetic coil for operation is detailed. Beginning at the right hand side of FIG. 2, elongated wire sensor 10 is shown in partial section emerging from sensor line holder 31 which, in the preferred embodiment is constructed of aluminum. Sensor line holder 31 is of cylindrical construction having a closed off end with an opening therethrough to pass elongated wire sensor 10. Protruding from opposite sides through threaded openings in sensor line holder 31 are graphite set screws 33 which are adapted to engage the sides of an inner cup-like graphite lock 35 which also, in the preferred embodiment, has an opening through its closed end for engaging notch 14 formed proximate the connection of elongated wire sensor 10 to magnetostrictive head 20. Graphite lock 35 is separable into two halves which come together around primarily magnetostrictive head 20 and the connection between elongated wire sensor 10 and magnetostrictive head 20. A protruding inward directed annular ring in the opening formed by cup-like graphite lock 35 is adapted to engage notch 14 of the elongated wire sensor 10 in order to hold in a secure configuration the wire sensor 10.

It is noted that the notch of circumferential groove 14 formed in elongated wire sensor 10 is formed very close to the butt weld joining sensor 10 and magnetostrictive head 20. It has been determined that because of the large discontinuity at this joinder, even to reflecting reflected acoustic waves, in order to reduce parasitic reflection oscillations between the joinder and notch 14, notch 14 is located, in the preferred embodiment, approximately 1 mm from the weld. By such method, in addition to reduction of parasitic reflections, reflections from each discontinuity are merged into one return reflection.

While inner cup-like graphite lock 35 has been shown, for ease of illustration, to have an outer diameter considerably less than the inner diameter of sensor line holder 31, it should be understood that in the preferred embodiment it is anticipated that there shall be minimal space between the outside circumferential surface of graphite lock 35 and the inner cylindrical surface of sensor line holder 31. When the device of FIG. 2 is assembled, graphite lock 35 slides into place interior to sensor line holder 31 and graphite set screws 33 protrude only slightly into the cavity of sensor line holder 31 before engaging graphite lock 35.

In addition, in the preferred embodiment, graphite is the preferred material constructing lock 35 since graphite is a material which can be made hard and has a high acoustic mismatch with the elongated wire sensor 10 such as to minimize interference of the propagation of the primary acoustic pulse and its reflected acoustic pulses.

Shown also in FIG. 2 at the intersection of elongated wire sensor 10 and magnetostrictive head 20 is the weld fillet by which the two elements are joined. The primary holding mechanism between graphite lock 35 and the ultrasonic thermometer is the engagement of notch 14 by the inward directed annular ring of graphite lock 35, although in FIG. 2, magnetostrictive head 20 is shown abutting the interior wall of graphite lock 35. It is obvious that since graphite set screws 33 engage the side of graphite lock 35, the orientation with respect to the halves of graphite locks 35 is to make the halve separation at a 90° angle to the engagement by the graphite set screws 33. This is easily accomplished during assembly.

Continuing in FIG. 2, extension rods 37, in the preferred embodiment constructed of aluminum, engage blind threaded holes formed in an axial direction in the cylindrical walls of sensor line holder 31, although, if it is desired, these threaded holes may be completely drilled out through the wall of sensor line holder 31 to emerge from the opposite side, and extension rods 37, being threaded, are held by nuts on both sides of sensor line holder 31.

For simplicity, in FIG. 2 shown in partial section are the aluminum rods 37 and magnetostrictive head 20, the opposite ends of which are connected and surrounded by bobbin holder 39 respectively, which, in the preferred embodiment, is also constructed of aluminum, Bobbin holder 39 comprises a substantially solid cylinder having through its center in its axial direction an opening for magnetostrictive head 20 to pass therethrough, and two openings on either side of magnetostrictive head 20 to receive aluminum rods 37 which, in the area proximate bobbin holder 39, are threaded to receive a pair of threaded nuts 38 and 40. Attached to the end face of bobbin holder 39 is bobbin 41, bobbin 41 in the preferred embodiment is constructed of alumina (aluminum oxide), with the flat circular side of bobbin 41 attached to the flat circular side of bobbin holder 39 by an adhesive. Bobbin 41 is spool-shaped, containing in its annular cavity electromagnetic coil 51. Electromagnetic coil 51 in the preferred embodiment, comprises 124 turns of No. 44 insulated copper wire.

As is obvious in viewing FIG. 2, in assembling the fixture shown in FIG. 2, the graphite lock 35 halves are placed around magnetostrictive head 20 such that the inwardly protruding annular ring in the opening of graphite lock 35 engages the annular groove 14 of the elongated wire sensor 10. When that is accomplished and the halves of graphite lock 35 engaged, elongated wire sensor 10 is slid through the opening in sensor line holder 31 until the graphite lock 35 bottoms in the cavity of sensor line holder 31, at which time set screws 33 are screwed in to engage the cylindrical side of graphite lock 35. Extension rods 37 are then screwed into sensor line holder 31 until they bottom, and then nuts 38 screwed onto extension rods 37 to a bottoming position. The bobbin holder 39 is inserted in place over magnetostrictive head 20 and the twin extension rods 37, and nuts 40 put in place. Final adjustment of bobbin holder 39 in place is accomplished with all the system attached and working since the placement of the bobbin holder 39 in relationship to magnetostrictive head 20 in order to null out unwanted reflections is accomplished with the equipment working.

With respect to the earlier mentioned reflection of the acoustic pulse from the free end of magnetostrictive head 20, as well as minimizing reflection from the joinder of magnetostrictive head 20 and elongated wire sensor 10, the bobbin holder 39 having attached bobbin 41 is adjusted by means of nuts 38 and 40 on aluminum rods 37 while observing the electrical pulse sent through electromagnetic coil 51 and the reflected pulse from the free end of magnetostrictive head 20. This reflective pulse, which will be the first in line of reflected pulse because the free end of magnetostrictive head 20 is the closest discontinuity to the place of the originating pulse, will either be additive or subtractive to the original acoustic pulse depending upon the time relationship of the return pulse to the pulse just generated. Since it is anticipated that bobbin 41 will be proximate the free end of magnetostrictive head 20, the time for the beginning edge of the acoustic pulse to travel to the free end of magnetostrictive head 20 and back is very short, it will join the acoustic pulse still being produced and reinforce it, or join the end of it to give a longer continuous pulse.

However, if through misadjustment of the bobbin holder 39, the acoustic pulse from the free end of magnetostrictive head 20 follows the primary acoustic pulse by any sizable time down the wire sensor 10, interference with reflected pulses will be caused as well as the generation of ghost images, all to contribute to gross inaccuracies, false readings, and considerable electrical noise observed on the sensed reflected pulses on the electrical leads of electromagnetic coil 51.

With respect to the signal processing/computing unit 60 containing timers/counters shown in FIG. 1, the operation of which has already been described, such units are well within the state of the art and are commercially available, such as the John Fluke Manufacturing Company, Universal Counter/Timer, Model 7261A, and Hewlett Packard Mini computer, Model 9845. Such processors/computers display the elasped time between reflected pulses, or with the application of known algorithms, will display sensed average temperature between adjacent discontinuities.

Figure 3:
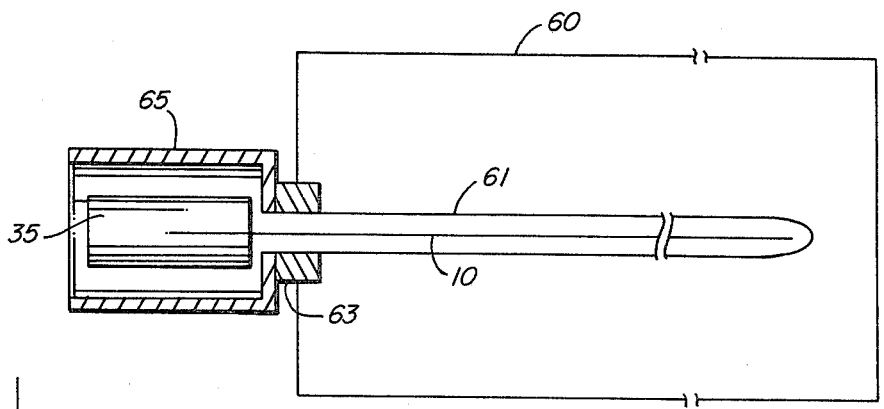
FIG. 3 is a cross-sectional view of a typical application of Applicant's device.

Referring now to FIG. 3, Applicant's device is shown in a typical setting for measuring temperatures and temperature profiles interior to an elevated temperature furnace. Shown in greatly exaggerated cross-section is the protective means that surrounds the invention during times of temperature measurement, for example, sheath 61 penetrates to the interior of furnace 60 from the outside environment through an opening in furnace 60. The sheath 61 is sealed at the opening through sealing means 63 which prevent the environment in furnace 60 from leaking out. In open communication with the interior of sheath 60 is housing 65, housing 65 adapted to receive sensor line holder 31 and bobbin holder 39 (here represented by block 35) together with their attachments, while elongated wire sensor 10 resides interiorly to sheath 61. It is very common to place ultrasonic thermometers, or the elongated wire sensors, or both, in an inert atmosphere. This is especially true if the type of metal utilized in the elongated wire sensor is reactive to the components of air at elevated temperatures. Thoriated tungsten is known to oxidize at elevated temperatures and therefore this type of arrangement is suggested for this application.

When it is necessary to place the elongated wire sensor and/or the remaining portion of the invention in an inert atmosphere, the open end of housing 65 is sealed with the ultrasonic thermometer inside residing in an inert environment, and the electrical leads are brought out through the housing 65 with insulated stand-offs. The operation of the ultrasonic thermometer then is accomplished to connection to these electrical leads.

It is realized of course that while the Applicant has suggested materials to be used for the magnetostrictive head 20, the elongated wire sensor 10, and the graphite lock 35, it is known in the art that there are many materials which have similar properties as the magnetostrictive head, the elongated wire sensor, and the graphite lock, and these materials may be utilized as well as Applicant's suggested materials. There is no intent by Applicant to limit the invention to the type of materials suggested.

While a preferred embodiment of Applicant's device has been shown and described, it will be appreciated that there is no intent to limit the invention by such disclosure, but rather it is intended to cover all modifications and alternate embodiments falling within the spirit and the scope of the invention as defined in the appended claims.

I claim:

1. An improved ultrasonic thermometer of the pulse-echo type for measuring temperature comprising a magnetostrictive head, an acoustic pulse generating and pulse sensing means proximate said magnetostrictive head, said acoustic pulse generating and sensing means including a position electromagnetic coil surrounding said magnetostrictive head, and an elongated heat sensing wire joined to said magnetostrictive head, said elongated heat sensing wire having at least one surface discontinuity thereon, said acoustic pulse generating and pulse sensing means further including a cup-like lock having an open end receiving said magnetostrictive head and passing said elongated heat sensing wire through an opening in its opposite otherwise closed end, said lock adapted to secure said pulse generating and pulse sensing means to said elongated heat sensing wire proximate said magnetostrictive head, said lock defining material acoustically mismatched to said elongated heat sensing wire whereby when said electromagnetic coil generates an acoustic pulse in said magnetostrictive head, said magnetostrictive head transfers the pulse to said elongated heat sensing wire and the acoustic pulse propagates along the elongated heat sensing wire whereupon it is partially reflected by the discontinuity in the elongated heat sensing wire and reflected by the end of the elongated heat sensing wire back to the magnetostrictive head where it is sensed by the electromagnetic coil.

2. The improved ultrasonic thermometer as defined in claim 1 wherein said elongated heat sensing wire additionally defines a circumferential groove juxtaposed the joinder of the elongated heat sensing wire to said magnetostrictive head, and said lock defines a circular inwardly directed protrusion situated in said closed end opening adapted to engage said circumferential groove in a securing manner whereby said lock is fixedly secured to said elongated heat sensing wire.

3. The improved ultrasonic thermometer as defined in claim 2 wherein said pulse generating and pulse sensing means includes a sensor line holder attached to said lock, and a bobbin holder operably attached to said sensor line holder, said electromagnetic coil attached to said bobbin holder.

4. The improved ultrasonic thermometer as defined in claim 3 wherein said pulse generating and pulse sensing means includes adjustable extension rods connecting said sensor line holder and said bobbin holder, said extension rod providing means to adjust the position of said electromagnetic coil relative to said magnetostrictive head.

5. The improved ultrasonic thermometer as defined in claim 4 wherein said cut-like lock defines a separatable single end closed cylinder surrounding in part said magnetostrictive head and in part said elongated heat sensing wire.

6. The improved ultrasonic thermometer as defined in claim 5 wherein said sensor line holder defines a cylindrical shaped fixture adapted to fixedly hold and secure in its interior said lock and a portion of said magnetostrictive head and said elongated heat sensing wire, and said bobbin holder defining a cylindrical shaped fixture surrounding said magnetostrictive head.

7. The improved ultrasonic thermometer as defined in claim 6 wherein said elongated heat sensing wire includes a plurality of spaced-apart discontinuities formed on the surface thereon, said discontinuities reflecting a portion of the propagating acoustic pulse formed in said magnetostrictive head.

8. The improved ultrasonic thermometer as defined in claim 7 wherein said lock comprises a graphite material, said magnetostrictive head defines an alloy comprised of cobalt, iron, vanadium, and manganese, and said elongated heat sensing wire comprises thoriated tungsten.

9. The improved ultrasonic thermometer as defined in claim 4 further comprising an electrical pulse driver electrically connected to said electromagnetic coil, and a processor/computer electrically attached to said electromagnetic coil, said electrical pulse driver electrically pulsing said electromagnetic coil to generate the acoustic pulse in said magnetostrictive head, and said processor/computer receiving the reflected pulses from the discontinuities and end of the elongated heat sensing wire sensed by said electromagnetic coil whereupon the time between the generation of the acoustic pulse and the receipt of the acoustic pulse may be measured and the temperature between adjacent discontinuities in the elongated heat sensing wire determined.

* * * * *